(12) United States Patent
Schwartz et al.

(10) Patent No.: US 7,823,856 B2
(45) Date of Patent: Nov. 2, 2010

(54) HINGE AND BINDING APPARATUS FOR DISPLAYING CARDS AND PAPERS IN THE WORKPLACE

(75) Inventors: Russell J. Schwartz, Piedmont, CA (US); Michael Springer, San Francisco, CA (US)

(73) Assignee: Axzo Press LLC, Fairpoint, NY (US)

( * ) Notice: Subject to any disclaimer, the term of this patent is extended or adjusted under 35 U.S.C. 154(b) by 1168 days.

(21) Appl. No.: 11/423,835

(22) Filed: Jun. 13, 2006

(65) Prior Publication Data

US 2006/0225321 A1    Oct. 12, 2006

Related U.S. Application Data

(63) Continuation-in-part of application No. 11/042,483, filed on Jan. 24, 2005, now Pat. No. 7,124,954.

(60) Provisional application No. 60/538,546, filed on Jan. 22, 2004, provisional application No. 60/579,503, filed on Jun. 10, 2004.

(51) Int. Cl.
 *B41J 11/02* (2006.01)
 *B42F 13/20* (2006.01)

(52) U.S. Cl. .................. 248/442.2; 248/447.1; 248/457; 248/458; 402/36; 402/38

(58) Field of Classification Search .............. 248/441.1, 248/442.2, 447, 447.1, 447.2, 458, 457, 288.31, 248/292.12; 402/26, 36, 38, 39, 31, 34, 49, 402/3
See application file for complete search history.

(56) References Cited

U.S. PATENT DOCUMENTS

| | | | | |
|---|---|---|---|---|
| 5,082,235 A | * | 1/1992 | Crowther et al. | 248/442.2 |
| 5,167,394 A | * | 12/1992 | Hegarty | 248/454 |
| 5,692,848 A | * | 12/1997 | Wada | 402/39 |
| 5,819,456 A | | 10/1998 | Schwartz | |
| 5,836,709 A | * | 11/1998 | Cheung | 402/38 |
| 5,881,986 A | * | 3/1999 | Hegarty | 248/442.2 |
| 6,209,246 B1 | | 4/2001 | Schwartz | |
| 6,430,856 B1 | | 8/2002 | Schwartz | |
| 7,124,954 B2 | * | 10/2006 | Schwartz | 235/486 |
| 2004/0013463 A1 | * | 1/2004 | To | 402/26 |
| 2005/0163557 A1 | * | 7/2005 | England | 402/73 |
| 2006/0225321 A1 | * | 10/2006 | Schwartz et al. | 40/341 |

* cited by examiner

*Primary Examiner*—Amy J Sterling
*Assistant Examiner*—Tan Le
(74) *Attorney, Agent, or Firm*—Daniels Patent Law PLLC; Scott A. Daniels

(57) ABSTRACT

An apparatus for displaying cards and papers in the workplace includes a central shaft portion having a pair of ends, with each end including a generally semicircular ring portion adapted to capture the slots of one or more cards. The central shaft portion may be releasably captured in a channel of a universal mount or a single- or double swing arm portion. Removal of the shaft portion from the channel permits the shaft portion to be split open along a break, thereby opening the rings along breaks in the manner of a split-ring binder. Alternatively, the shaft portion may be used alone (without a mount or swing arms) to hold a quantity of cards. The swing arms may be hinged upon a base portion and attached to the chassis or peripheral surface surrounding a computer video monitor, so that the swing arms and shaft portion can swing forward and around to fit the user's viewing preferences. When affixed to a monitor, the semicircular rings facilitate easy installation and flipping of slotted cards and/or papers.

17 Claims, 11 Drawing Sheets

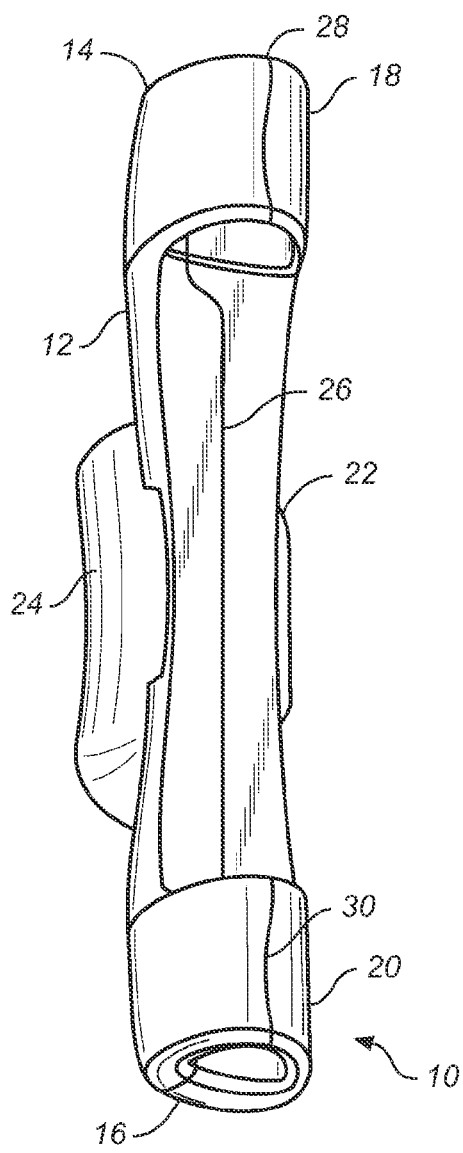
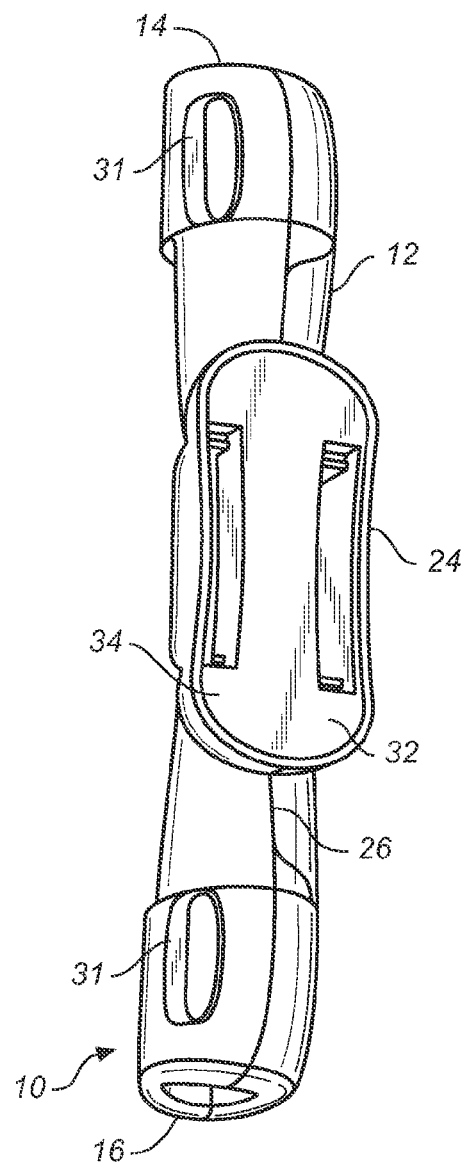
FIG. 1A  FIG. 1B

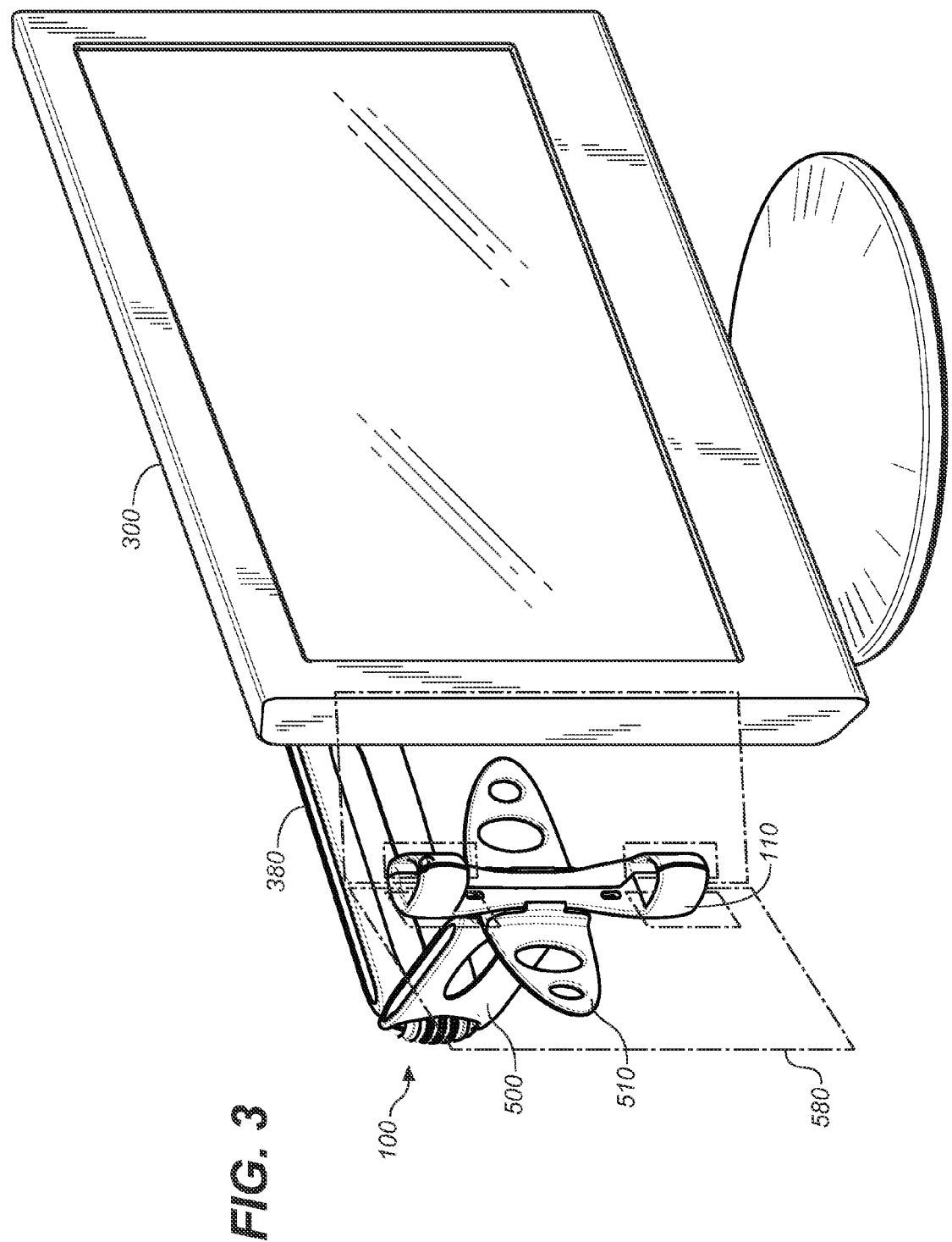

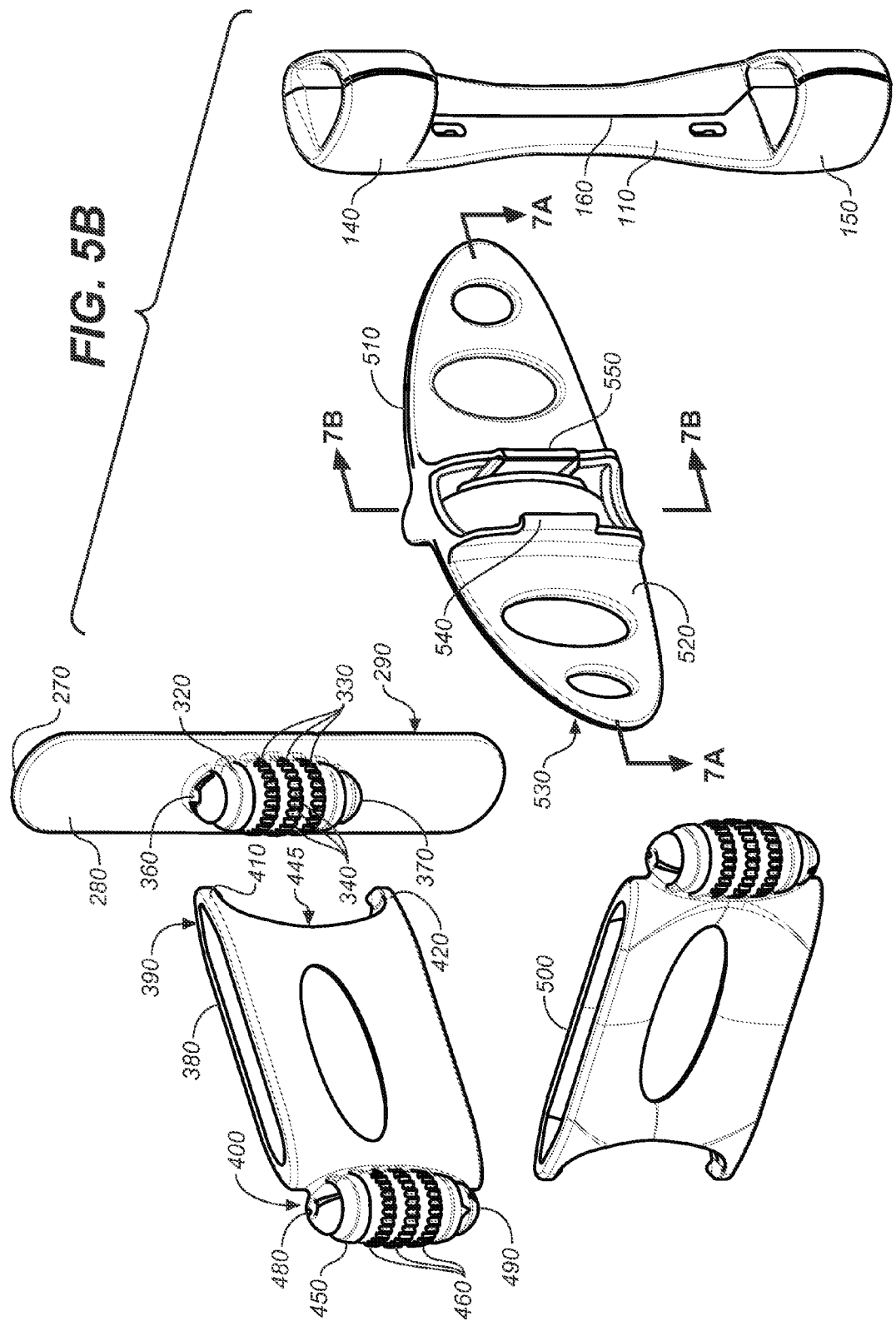

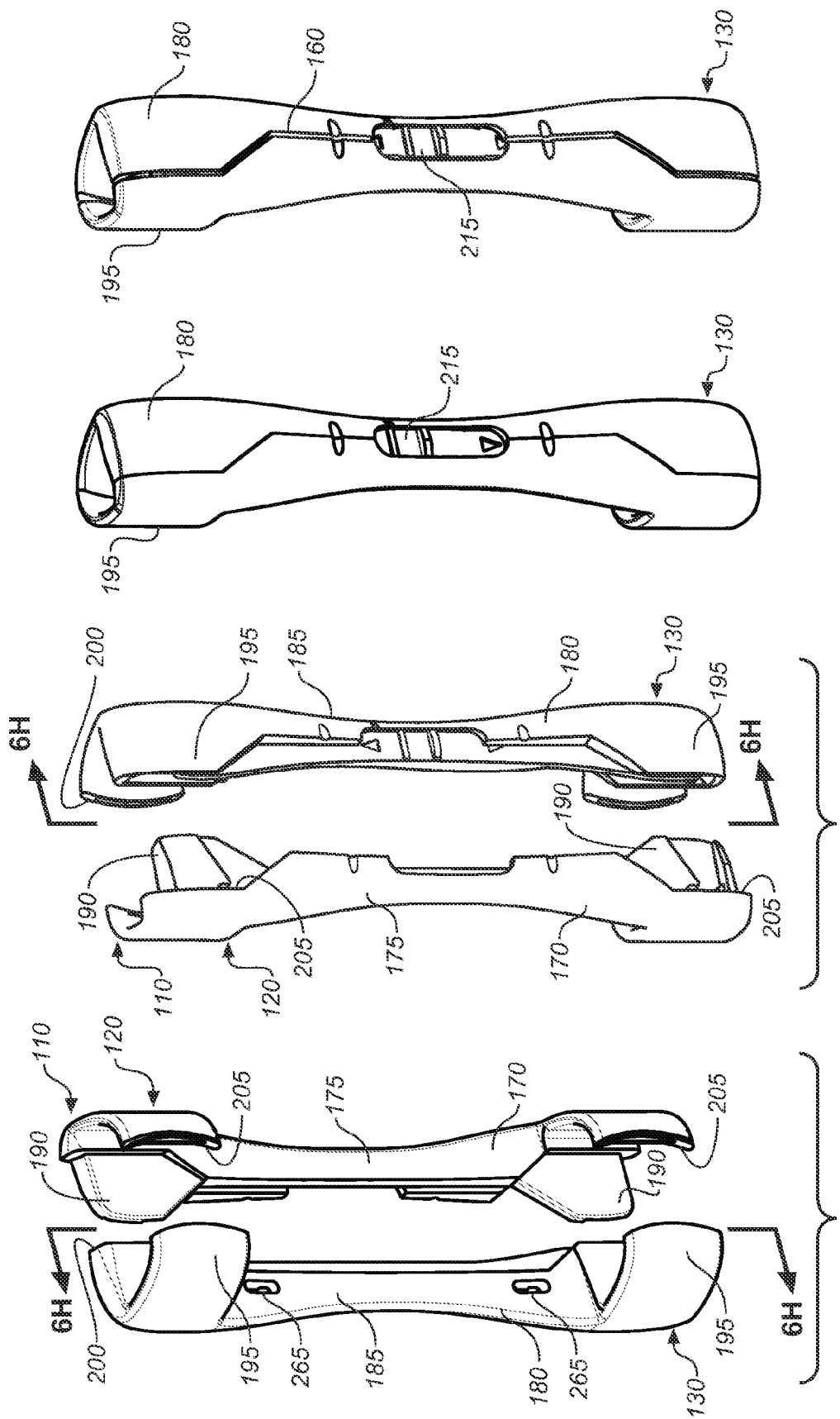

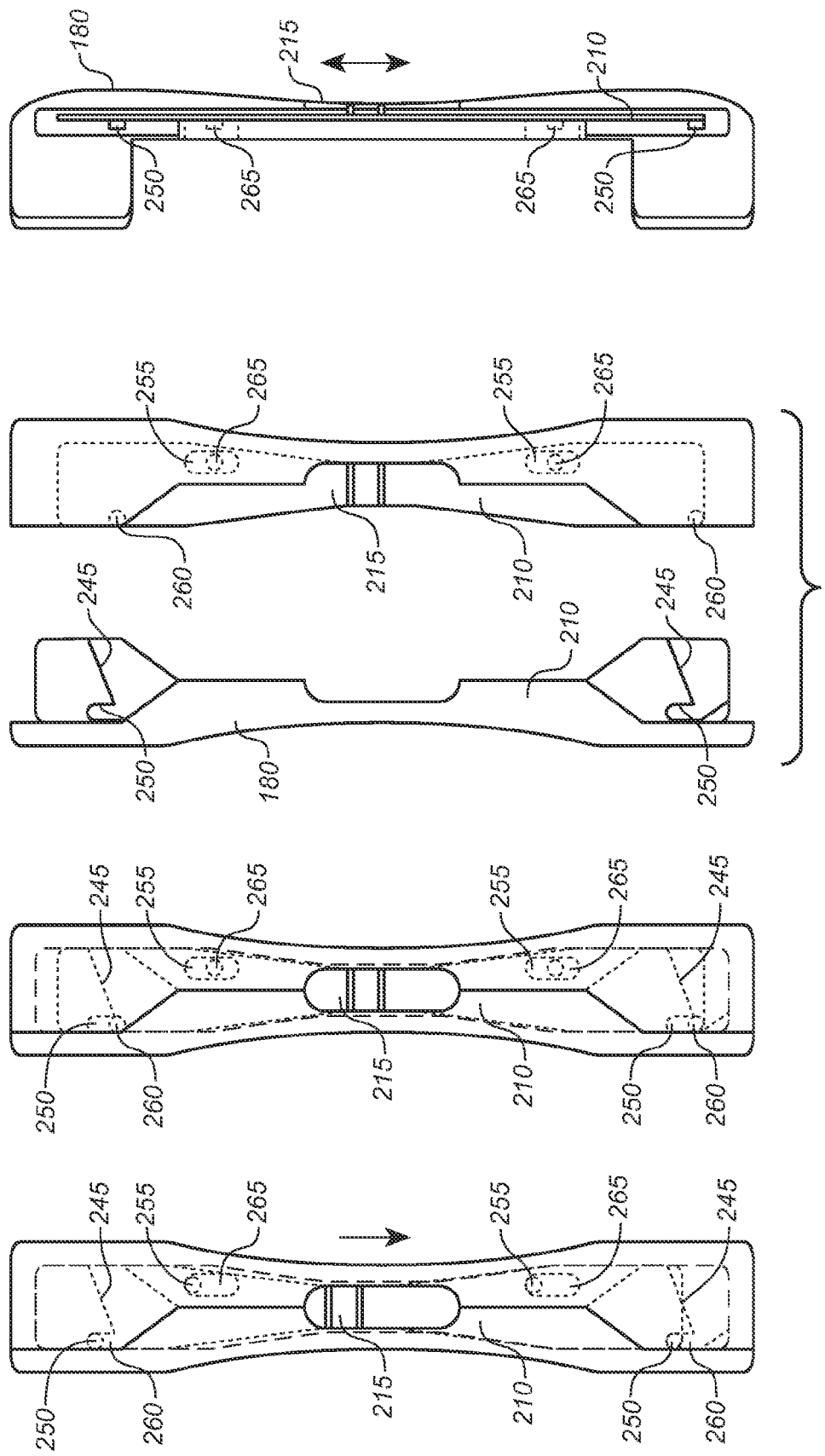

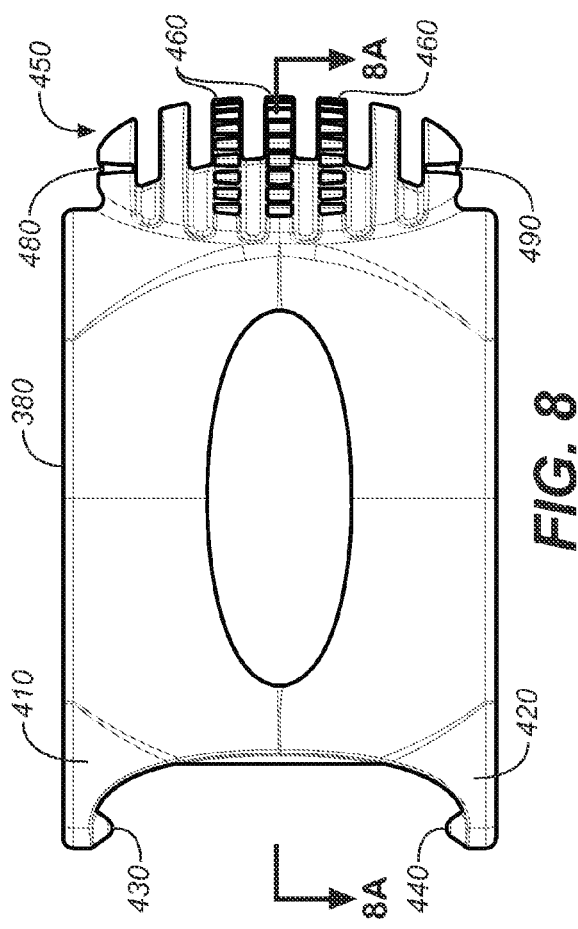
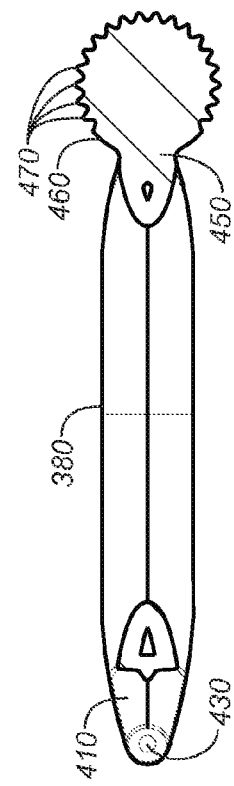
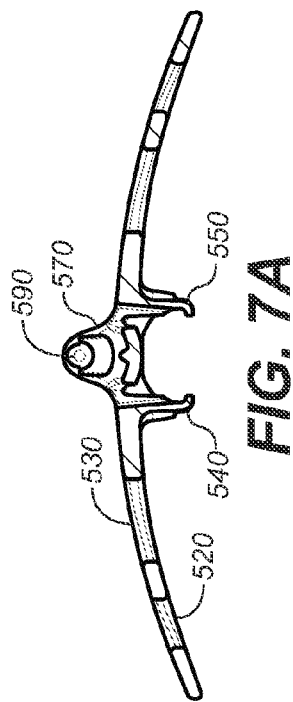
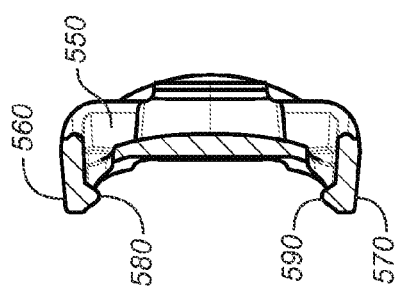
FIG. 8
FIG. 8A
FIG. 7A
FIG. 7B

US 7,823,856 B2

HINGE AND BINDING APPARATUS FOR DISPLAYING CARDS AND PAPERS IN THE WORKPLACE

CROSS REFERENCE TO RELATED APPLICATIONS

The present application claims the benefit of the filing date of U.S. patent application Ser. No. 11/042,483, filed 24 Jan. 2005, entitled, Hinge and Binding Apparatus for Displaying Procedural Information Cards in the Workplace, which application claims the benefit of U.S. Provisional Patent Application Ser. No. 60/538,546, filed Jan. 22, 2004, Jan. 22, 2004, for an I-beam Hinge for Displaying Technical Instruction Cards on a Computer Video Monitor, and U.S. Provisional Patent Application Ser. No. 60/579,503, filed Jun. 10, 2004 (Jun. 10, 2004), for a Hinge and Binding Apparatus for Displaying Procedural Information Cards in the Workplace, both by joint inventor herein, Russell J. Schwartz.

STATEMENT REGARDING FEDERALLY SPONSORED RESEARCH OR DEVELOPMENT

Not applicable

REFERENCE TO A MICROFICHE APPENDIX

Not applicable.

THE NAMES OR PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates generally to information display devices, and more particularly to an apparatus for displaying procedural information cards on a computer video monitor or other piece of equipment, in a cashiering area or other workplace space.

2. Discussion of Related Art Including Information Disclosed Under 37 CFR §§1.97, 1.98

Office workers, retail associates and other personnel routinely place instructional information in the immediate vicinity of their workstation. Commonly, such material includes personalized employer or manufacturer provided instructions regarding software use, policy, procedures, or other information. For the purposes of this disclosure, such material will be generally termed procedural information.

The prior art includes numerous devices for attaching items to a computer display device. However, until the present inventor disclosed an inventive mounting apparatus in U.S. Pat. No. 5,819,456, hereby incorporated by reference herein, there remained a need for an apparatus that enables a computer user to position a maximum amount of utilitarian and decorative items in his or her field of view near the display screen. The '456 patent teaches a display card mounting device for attaching an instructional card holder directly to a front bezel surface of a computer display. The apparatus can be used in connection with attachable/detachable cards, for training personnel to use computers. The display cards may include tips and hints for using popular word processing programs, spread sheets, proprietary software programs, or other information pertaining to products and services. The display cards may include printed indicia showing, for example, a summary of useful software commands such as "short-cut" control sequences for triggering commands or scripts for customer service representatives.

Typically, the cards and the mounting apparatuses are employed as training aids to assist personnel or students in learning new material. Without the benefit of the system of the '456 patent, companies often trained personnel, and schools trained students exclusively by providing user manuals and requiring the personnel or students being trained to learn the software commands by directly consulting the user manuals. Such user manuals are expensive and need frequent replacement with each software upgrade. For proprietary software, such upgrades may be frequent and such user manuals may be quite expensive, resulting in significant costs. Also, when personnel are required to learn by consulting user manuals, the time required to effectively train the personnel may also be significant. In particular, the personnel may be reluctant to frequently consult a potentially cumbersome user manual which often is not easily accessible, and therefore may not learn the necessary new material quickly or efficiently. Hence, human trainers are often employed to expedite training, resulting in still further costs.

With the system of the '456 patent, display cards containing, for example, a summary of pertinent software commands, are provided for mounting directly to the computer display. To learn the pertinent procedures, personnel being trained merely consult the display cards. Depending upon the information provided on the display cards, it may be completely unnecessary to provide a separate user manual. Hence, the costs associated with providing new user manuals or providing supplements or inserts to existing user manuals are substantially avoided. Rather, only the costs associated with providing the relatively inexpensive display cards and the mounting apparatuses of the invention may be incurred. Such is particularly desirable when training personnel to use proprietary software subject to frequent upgrades which would otherwise require obtaining frequent, and possibly expensive, user manual updates. Moreover, by eliminating the need to consult cumbersome user manuals, personnel being trained may be trained much more quickly and efficiently, further reducing training costs. In many circumstances trainers may no longer be required.

With the system shown in the '456 patent, the display cards are mounted parallel with the display screen of the computer such that personnel being trained can easily reference information by simply glancing at the display cards. Hence, the speed by which new information provided on the cards can be consulted is greatly increased. Also, personnel being trained are simply more likely to consult reference information when such reference information is provided immediately adjacent to, and parallel with, the computer display, than when provided separately. Hence, training time can be significantly reduced.

Depending upon the amount of information required to be summarized, several display cards may be provided to personnel or students. With the system of the '456 patent, the display cards are tabbed and pivotally mounted such that personnel or students being trained can easily flip to the card containing the desired information. Also, the display cards are mounted to the display screen of the computer using semi-ring card holding members such that the cards can be quickly replaced with new cards to accommodate changes, or to add cards for new procedures. Cards may be replaced selectively either individually or several at a time, and this results in substantial savings if and as card content changes.

Although the display card system described in the '456 patent represented a significant improvement over predecessor systems, room for improvement remained, and the present inventor taught and disclosed such improvements in U.S. Pat. Nos. 6,209,246 and 6,430,856, each of which were progeny of the originally filed disclosure for the '456 patent, and each of which are incorporated in their entirety by reference herein.

U.S. Pat. No. 6,209,246 discloses a card assembly for use with a computer display device which includes at least one card and a card holder for holding the card. In addition, the card assembly also includes a mounting unit that is connected to the card holder. This mounting unit rigidly and detachably affixes the card holder to the computer display device.

U.S. Pat. No. 6,430,856 teaches a card assembly with a pocket for use with a computer display device. A variety of mounting systems are provided for mounting display cards, photographs, or other material to a computer display device of a computer system. The display cards may include printed indicia showing, for example, a summary of useful software commands for use with software programs running on the computer system. In one embodiment, a pair of mounting units or hinges are provided for pivotably mounting the display cards to the computer display device so that selected cards may be pivoted into a position adjacent to a front surface of the display screen for ease of viewing. In another example, a transparent pocket is provided for receiving the display cards, with the pocket being pivotably mounted to the display device via the mounting units. By providing a pocket, the display cards are protected while in use. Also, the display cards need not include any mounting holes or other attachment elements for direct attachment to the mounting units. Rather, any suitably sized and shaped display card, photograph, sheet of paper, or the like may be inserted within the pocket for pivotal mounting to the computer display device via the mounting hinges.

As with the more recently issued '246 and '856 patents, the present invention is also directed to providing further improvements in the art.

The foregoing patents reflect the current state of the art of which the present inventors are aware. Reference to, and discussion of, these patents is intended to aid in discharging Applicants' acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

BRIEF SUMMARY OF THE INVENTION

The present invention provides an apparatus for displaying cards or papers with optional capability to attach to a computer video monitor or other piece of equipment either in a cashiering area or any other workplace space. In a first preferred embodiment, the inventive apparatus includes a central shaft portion having a pair of ends, with each end including a generally semicircular ring portion adapted to capture two generally elongate slots formed in one or more cards or papers, much as those adapted for use with well-known comb-bound documents. The central shaft portion may be releasably captured in a channel of a universal mount or swing arm portion. Removal of the shaft portion from the channel permits the shaft portion to be split open along a longitudinal break, thereby opening the rings along breaks in the manner of a split-ring binder.

Alternatively, the shaft portion may be used alone (i.e., without a mount or swing arm) to hold a quantity of cards. The ring portions can be hinged, spring-loaded, or otherwise adapted to be opened to accommodate the slots of procedural information cards in any other of a variety of ways. The swing arm may be hinged upon a base portion with attachment means for affixing the apparatus to the chassis or peripheral surface surrounding a CRT or LCD computer video monitor, so that the swing arm and shaft portion can swing forward and around, toward the middle of the screen. When affixed to a monitor, the semicircular rings facilitate easy installation and flipping of instructional cards of the type shown in U.S. Pat. No. 6,430,856. The universal mount could be used to affix the apparatus to any equipment or workplace surface.

In yet another embodiment, the inventive apparatus includes multiple swing arms for increased adjustability of the display portion of the apparatus. Further, the central shaft portion comprises two side selectively and releasably combined with a latching mechanism, thus enabling use with or without a channel in a universal mount or swing arm. The latching mechanism facilitates one-handed separation of the central shaft portion sides, and the multiple swing arms articulate to a large number of substantially fixed positions to provide the user with an easy means of finding a comfortable and practical positioning for the cards or other reading material.

It is therefore an object of the present invention to provide a new and improved apparatus for cards and other documents in the workplace environment.

It is another object of the present invention to provide a new and improved apparatus for adding and removing such cards and documents.

A further object or feature of the present invention is a new and improved apparatus for flipping the cards so displayed.

An even further object of the present invention is to provide a novel apparatus for positioning the cards relative to a computer monitor or other piece of equipment.

Other novel features which are characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

BRIEF DESCRIPTION OF THE SEVERAL VIEWS OF THE DRAWINGS

The invention will be better understood and its objects and advantages will become apparent when consideration is given to the following detailed description thereof. Such description makes reference to the annexed drawings wherein:

FIG. 1A is a front perspective view of a first embodiment of a hinge and binding apparatus for displaying procedural information cards in the workplace of the present invention;

FIG. 1B is a rear perspective view of the hinge and binding apparatus of FIG. 1A;

FIG. 3 is a perspective view showing a third preferred embodiment of the present invention mounted on a flat panel monitor;

FIG. 5B is an exploded perspective view of the third preferred embodiment;

FIG. 6A is a front perspective view showing the separated right and left sides of the central shaft portion of the third preferred embodiment;

FIG. 6B is a rear perspective view thereof;

FIG. 6C is a rear perspective view showing the right and left sides of the central shaft portion coupled and the latching mechanism in a locked configuration;

FIG. 6D is a rear perspective view showing the sides of the central shaft portion beginning to separate as the button of the latching mechanism is moved toward the unlocked configuration;

FIG. 6E is a rear view in elevation corresponding to FIG. 6C;

FIG. 6F is a rear review in elevation corresponding to FIG. 6D;

FIG. 6G is a rear view in elevation corresponding to FIGS. 6A and 6B;

FIG. 6H is a side view in elevation of

FIG. 7A is a top cross-sectional view of the document support of FIG. 5B, shown along section line 7A;

FIG. 7B is a side cross-sectional view of the document support of FIG. 5B, shown along section line 7B;

FIG. 8 is a side view in elevation of the swing arm of the third preferred embodiment; and FIG. 8A is a top plan view of the swing arm of FIG. 8, shown along section line 8A.

DETAILED DESCRIPTION OF THE INVENTION

Figure 2A:
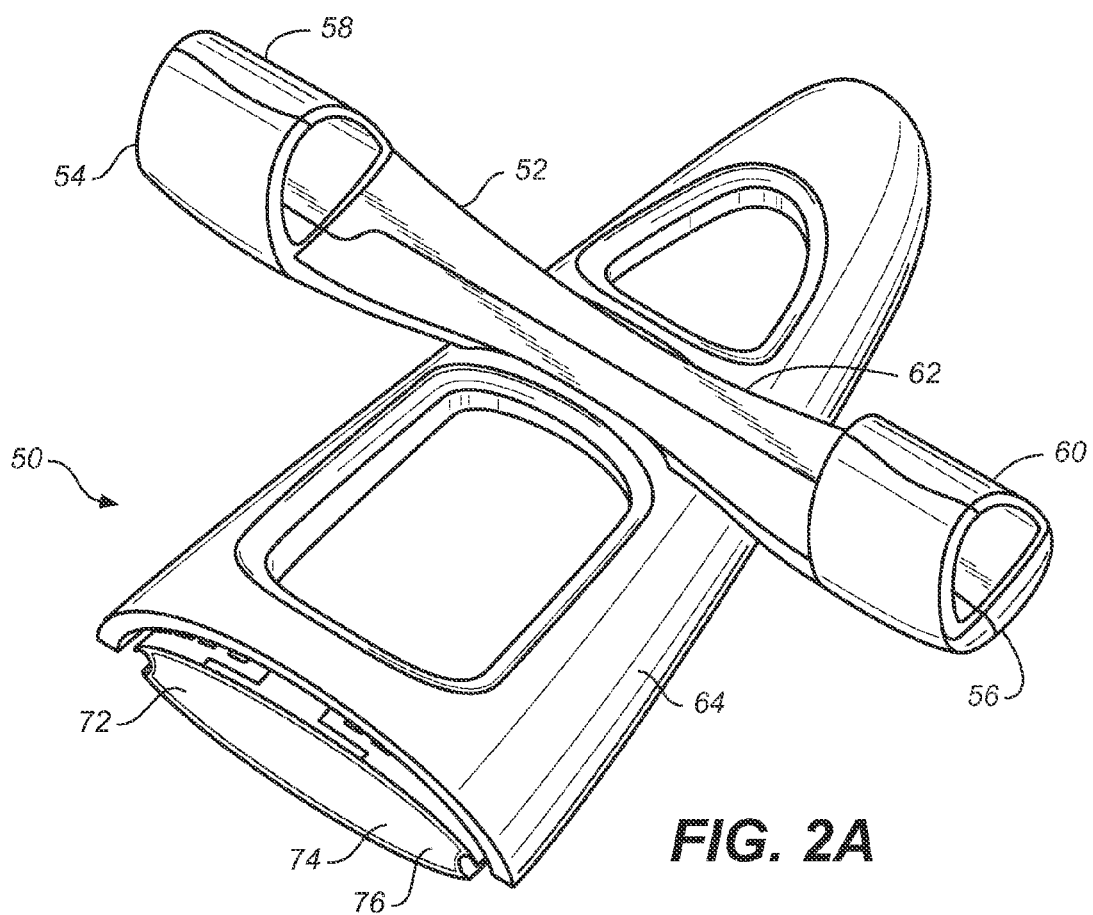
FIG. 2A is a front perspective view of a second embodiment of a hinge and binding apparatus for displaying procedural information cards in the workplace of the present invention.

Referring to FIGS. 1A through 1B, wherein like reference numerals refer to like components in the views, there is illustrated therein first embodiment of a new and improved hinge and binding apparatus for displaying procedural information cards in the workplace, generally denominated 10 herein. These figures illustrate a first preferred embodiment of the present invention.

The inventive apparatus may be summarily characterized as a procedural information card hinge, and comprises a central shaft portion 12 having an upper end 14 and a lower end 16. Each end includes a generally semicircular ring portion 18, 20, adapted to capture the slots of one or more procedural information cards or other documents.

The central shaft portion 12 may be releasably captured in channel 22 of universal mount 24. Removal of the central shaft portion 12 from the universal mount 24 permits the shaft portion to be split open along longitudinal break 26, thereby opening the rings along breaks 28, 30 in the manner of a split-ring binder. The shaft portion is prevented from inadvertent opening by snaps or tabs 31, which are manually engaged and released with finger tip pressure. Alternatively, the ring portions 18, 20 could be hinged, spring-loaded, or otherwise adapted to be opened and closed to accommodate the slots of procedural information cards in any other of a variety of ways well known in the art.

The rear surface 32 of the universal mount 24 includes attachment means 34 for affixing the apparatus to the chassis or peripheral surface surrounding a CRT or LCD computer video monitor, or other surface. Preferably the attachment means comprises double-sided adhesive material or hook-and-loop fastener, though any suitable affixation means is contemplated in the present disclosure. Accordingly, when affixed to a monitor, the semicircular rings 18, 20 facilitate easy installation and flipping of instructional cards of the type shown in FIG. 10 of U.S. Pat. No. 6,430,856.

Figure 2B:
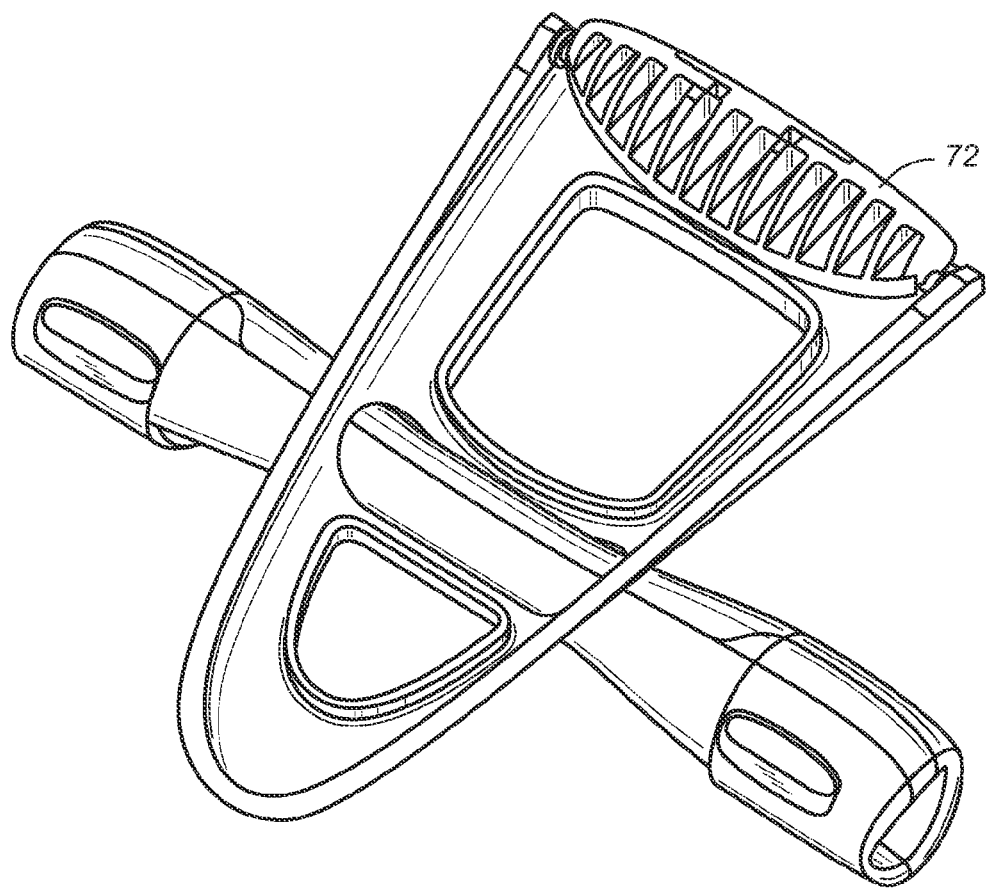
FIG. 2B is a rear perspective view of the hinge and binding apparatus of FIG. 2A.
Figure 2C:
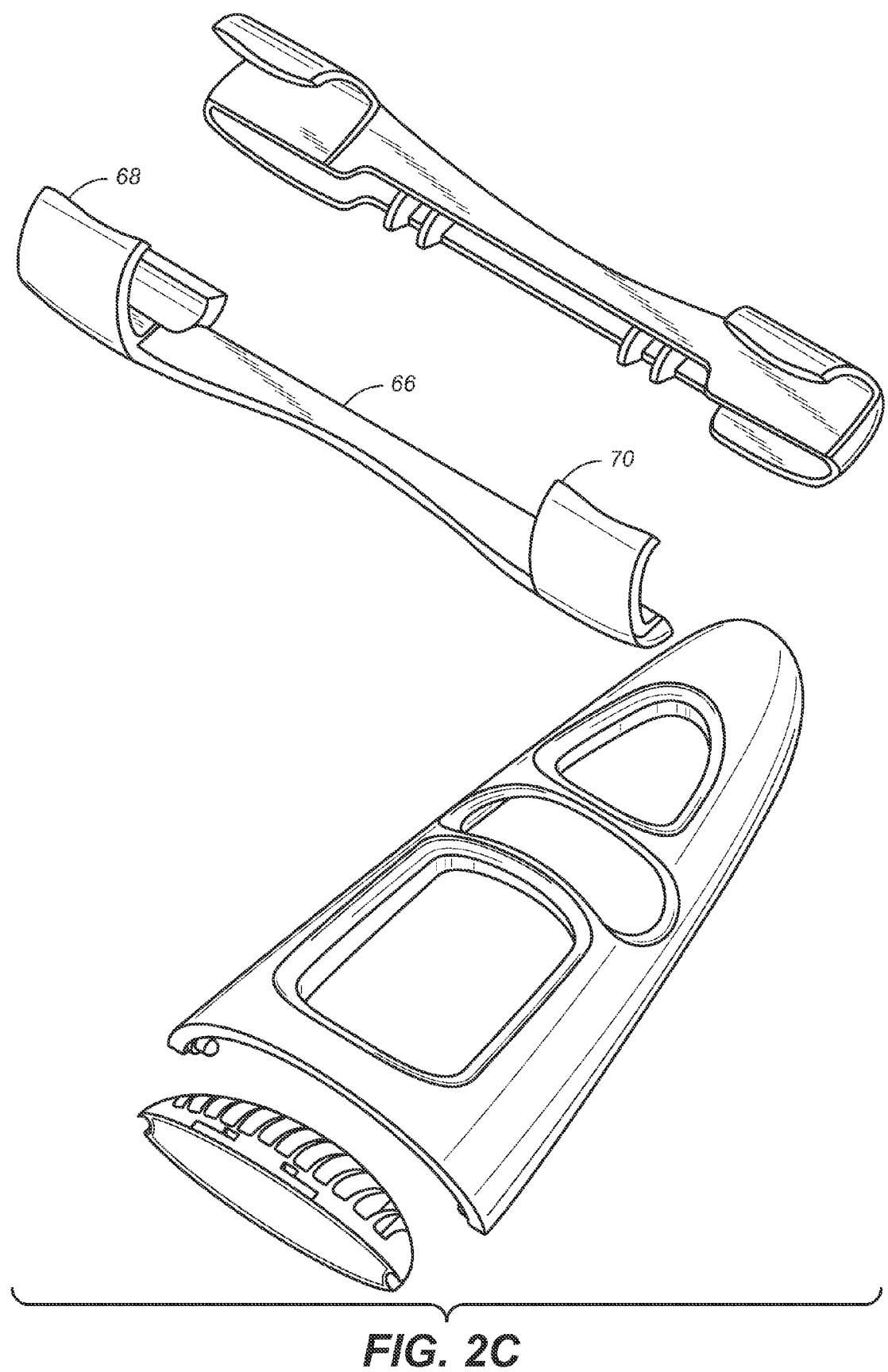
FIG. 2C is an exploded front perspective view of the hinge and binding apparatus of FIG. 2A, illustrating the splitting of the shaft portion to open the semicircular ring portions.
Figure 4:
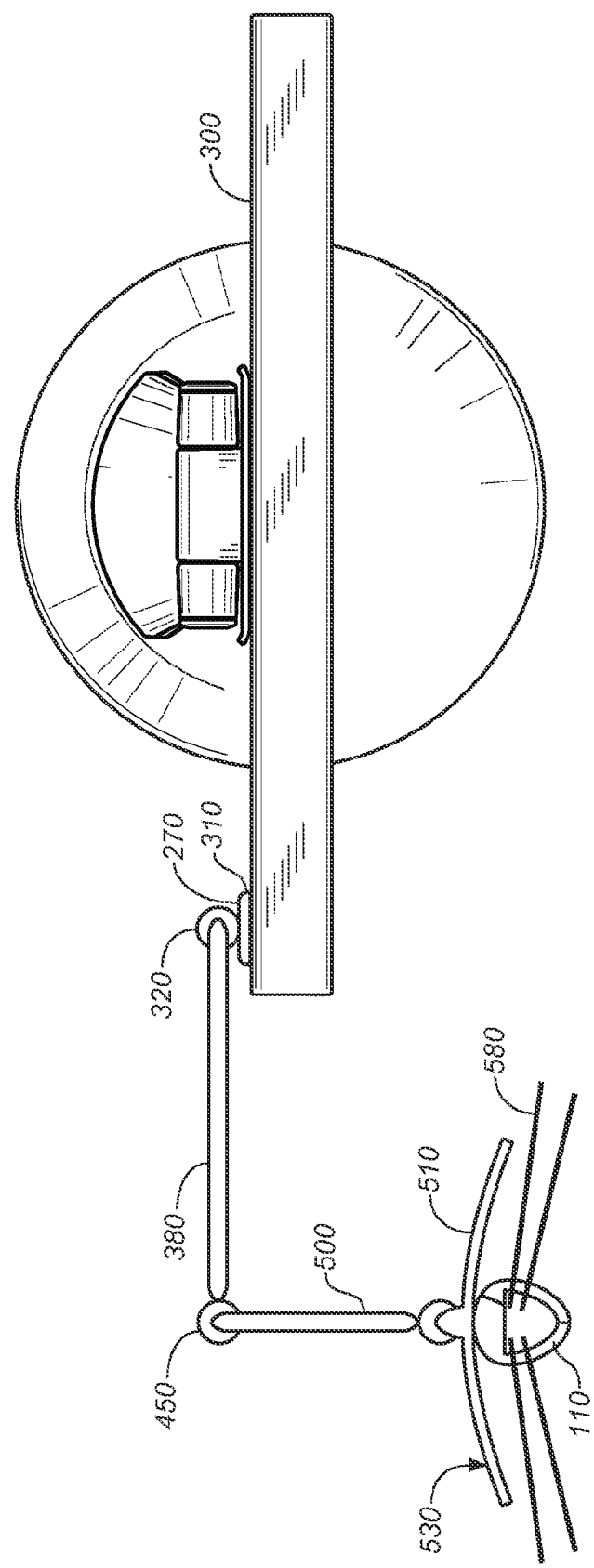
FIG. 4 is a top plan view of FIG. 3.
Figure 5A:
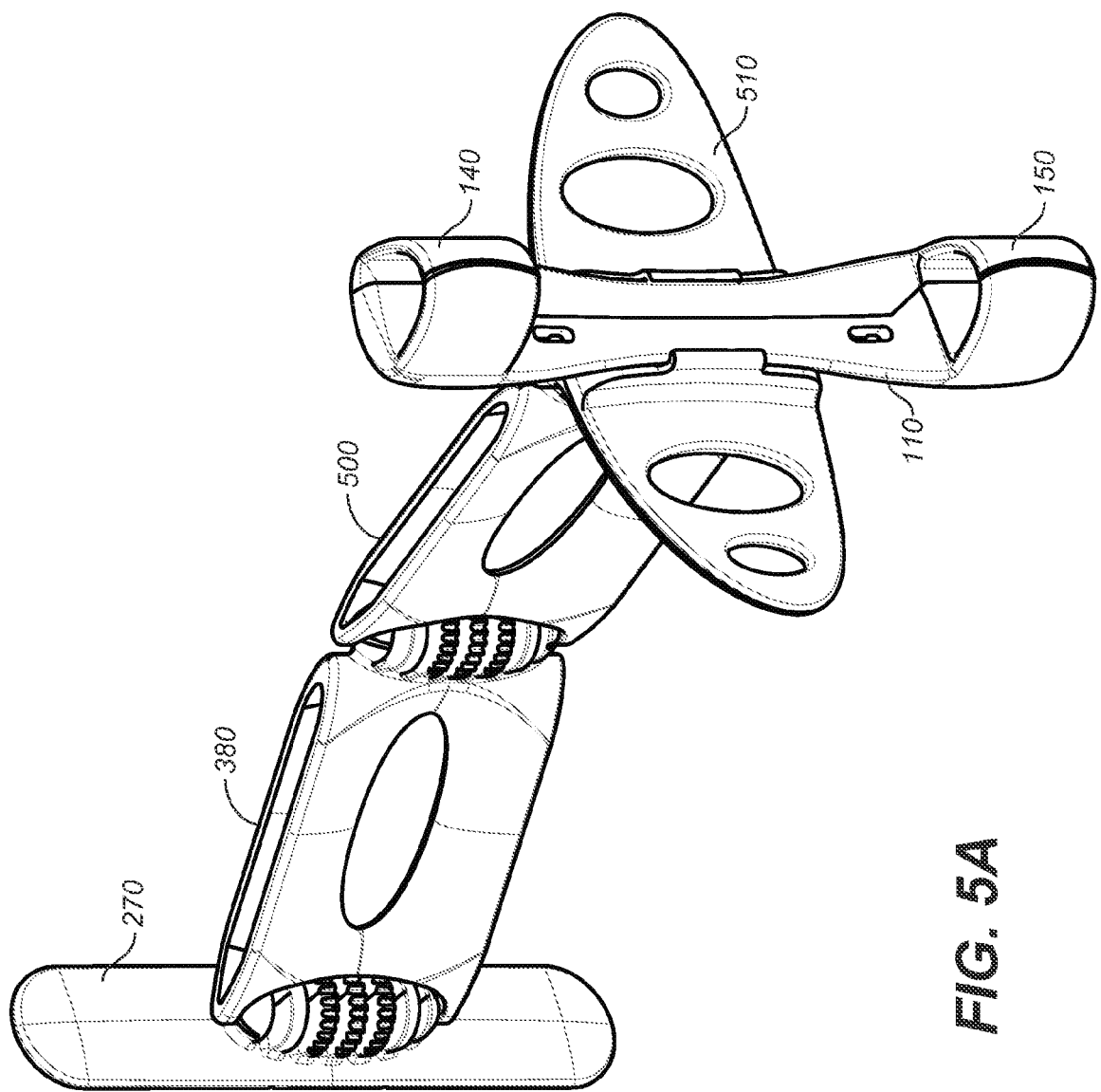
FIG. 5A is a perspective view showing the essential structural and functional elements of the third preferred embodiment.

FIG. 2A through 2C show a second preferred embodiment 50 of a hinge and binding apparatus for displaying procedural information cards in the workplace of the present invention. FIG. 2A is a front perspective view, while FIG. 2B is a rear perspective view, and FIG. 2C is an exploded front perspective view, illustrating the splitting of the shaft portion to open the semicircular ring portions.

This second embodiment 50 of the hinge and binding apparatus comprises a central shaft portion 52 having a first end 54 and a second end 56. Each end includes a generally semicircular ring portion 58, 60, adapted to capture the slots of one or more procedural information cards.

The central shaft portion 52 may be releasably captured in channel 62 of swing arm 64. Removal of the shaft portion 52 from the swing arm 64 permits the shaft portion to be split open along longitudinal break 66, thereby opening the rings along breaks 68, 70 in the manner of a split-ring binder. Alternatively, the ring portions 58, 60 could be hinged, spring-loaded, or otherwise adapted to be opened and closed to accommodate the slots of procedural information cards in any other of a variety of ways well known in the art.

Swing arm 64 may include hinged connector 72. The rear surface 74 of the hinged connector 72 includes attachment means 76 for affixing the apparatus to the chassis or peripheral surface surrounding a CRT or LCD computer video monitor, e.g., to the side of a monitor near the front edge. Preferably the attachment means comprises double-sided adhesive material or hook-and-loop fastener, though any suitable affixation means is contemplated in the present disclosure. Accordingly, when affixed to a monitor, the swing arm and shaft portion can swing forward and around, toward the middle of the screen, and the semicircular rings 58, 60 facilitate easy installation and flipping of instructional cards of the type shown in FIG. 10 of U.S. Pat. No. 6,430,856.

As a further alternate application of the invention, the hinge and binding apparatus may be used independently of a computer monitor. For example, the universal mount of the apparatus could be placed on a desk, shelf, wall, or other surface, to provide a stand-alone display for procedural information cards, technical instruction cards, or other cards or material.

Referring now to FIGS. 3-8A, a third preferred embodiment of the inventive hinge and binding apparatus is illustrated, and is generally denominated 100. In this embodiment, the hinge and binding apparatus includes a central shaft portion 110 having upper and lower ends 120, 130, at each one of which are disposed semicircular rings, 140, 150, and a longitudinal break 160 bifurcating the shaft portion into a right side 170 and a left side 180. The two sides of the central shaft portion are brought into register for coupling or combining by inserting male portions 190 of the right side into female slots 200 in the left side, as well as upper and lower male annular ring portions 195 in the left side into upper and lower annular female ring portions 205 in the right side. When combined, the annular male and female portions define generally semicircular ring portions disposed on the upper and lower ends of the central shaft portion.

Each central shaft portion half is hollow in its medial portion 175, 185, and when combined, the right and left sides define a interior void 115 into which a latching mechanism is disposed. This mechanism provides means for one-handed, rapid selective separation of the central shaft portion sides, and comprises a substantially flat slider 210 having an integral button 215 which is exposed for manual operation through an access slot 220 formed by recesses 230, 240 in the respective right and left sides when the sides are combined. The slider is retained in the left side of the central shaft portion by posts 265 which project into and move within longitudinal slots 265 in the body of the left side. The button may be moved longitudinally, its movement range limited by the post- and-slot elements.

As the right side of the central shaft portion is combined with the left side, retention posts 250 disposed on the slider 210 engage and slide along ramps 245 formed on the surface of male portion 190. As the longitudinal break of the right and left sides is approximated, the posts become aligned with slots 260 at the side of the ramps [FIG. 6F], thus enabling up and down movement of the slider by actuating the button 215. Pushing the button into the locked configuration [FIGS. 6C, 6E] captures and retains the posts 250 in slots 260.

The central shaft portion right and left sides may be disengaged and released when the button and slider are moved in the opposite direction and into the unlocked configuration [FIG. 6D].

The third preferred embodiment further includes a support mount 270 having a front side 280 and a rear side 290, and attachment means by which the mount may be affixed to any suitable surface, such as a flat panel monitor 300, desk, shelf, wall, or other surface. As with the second embodiment, the attachment means may comprise an adhesive rear surface 310 for use on flat panel or other computer monitor chassis, or it can comprise any of a number of other well known fastening means.

The front side 280 of the support mount includes an integrally formed support mount attachment structure 320, which comprises a football-shaped partial barrel structure having several stacked and spaced-apart partial disks 330, each with gear teeth 340, and upper and lower cups 360, 370.

A first swing arm 380 is provided for pivotal attachment to the mount via the support mount attachment structure. The first swing arm includes an inboard end 390 and an outboard end 400, the inboard end including inboard attachment structure comprising integrally formed fingers 410, 420, each having inwardly pointing dome-shaped ball ends 430, 440, which snap into the upper and lower cups 360, 370, respectively, of the support mount attachment structure 320 to form a cup and ball hinge. The inboard end also includes an arcuate indexing edge 445 shaped to engage and track the gear teeth with tight tolerances to provide an axial positioning (indexing) mechanism which employs the gear teeth as radially arranged detents. Accordingly, the gear teeth capture and retain the indexing edge until a sufficient radial force is imparted to the swing arm, in which event it may be moved radially as it pivots on the cup-and-ball hinge in increments of clicks, one gear tooth detent at a time.

The outboard end 400 of the first swing arm includes outboard attachment structure, including a football-shaped partial barrel structure 450 substantially identical to that disposed on the front side of the mount, including spaced apart stacked partial disks 460 having radially disposed gear teeth detents 470, and upper and lower cups 480, 490. This structure differs from that disposed on the front side of the mount in that each of the stacked disks preferably includes a larger sweep of arc as any attached structure is not limited by a flat front side, as is the case with the stacked disks disposed on the barrel of the mount.

It will be appreciated that the stacked disks and detents do not comprise attachment structure per se, but rather provide the indexing mechanism disposed within the cup-and-ball hinge.

A second swing arm 500, identical to the first swing arm may also be provided, as may a third or fourth, and possibly more.

Next, the third embodiment includes a document support 510, which provides a stop and a support when cards or pages are turned either in a horizontal plane or in a vertical plane. The document support includes a front side 520 and a rear side 530, the front side including two integrally formed walls 540, 550 forming a bracket for capturing and retaining the central shaft portion. The rear side of the document support includes opposing integral upper and lower fingers 560, 570 having ball ends 560, 570 for snapping into the upper and lower cups of a barrel structure on a swing arm.

The elements of the third embodiment may be assembled into an adjustable arm extending a distance upwardly, sidewardly, and around a computer monitor 300. In this manner, there is provided a secure support for card, papers, and other documents 580 that may be viewed concurrently with the use of a computer.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

For instance, it will be appreciated to one having skill in the art that the elements providing pivotal connections between the swing arms, the support mount, and the document support, could be reversed, such that the support mount included opposing fingers with opposing balls, the inboard attachment structure included upper and lower cups, the outboard ends included fingers with opposing balls, and the document support included upper and lower cups.

Therefore, the above description and illustrations should not be construed as limiting the scope of the invention, which is defined by the appended claims.

What is claimed as invention is:

1. An apparatus for displaying documents, said apparatus comprising:
    a central shaft portion having a right side and a left side, each of said right and left side having an upper end and a lower end, one of said right and left sides each having a female annular portion on each of said upper and lower ends, and one of said right and left sides having a male annular portion disposed on each of said upper and lower end for matable insertion into said annular female portions, such that when said right and left sides are combined, said annular male and female portions form upper and lower generally semicircular ring portions adapted to capture the slots of one or more documents, said central shaft portion further including means for selectively and releasably coupling said right and left sides of the central shaft portion into a locked configuration;

a support mount having a front side with support mount attachment structure and a rear side for mounting on a surface, wherein said support mount attachment structure includes upper and lower cups, and said inboard attachment structure comprises integral upper and lower fingers with ball ends adapted for a snap fit into said upper and lower cups of said support mount attachment structure so as to form a cup and ball hinge; and at least one swing arm disposed between said central shaft portion and said support mount, said swing arm having an inboard end with inboard attachment structure for pivotal connection to said support mount attachment structure or to an outboard end of another swing arm and an outboard end with outboard attachment structure.

2. The apparatus of claim 1, further including a document support having a front side and a rear side.

3. The apparatus of claim 2, wherein said document support rear side includes document support attachment structure for pivotal connection to an outboard attachment structure of one of said swing arms.

4. The apparatus of claim 2, wherein said document support front side includes a bracket for capturing and retaining said central shaft portion.

5. The apparatus of claim 4, wherein said bracket comprises partially resilient opposing walls and wherein said central shaft portion is snap connected to said document support between said walls.

6. The apparatus of claim 1, wherein said outboard attachment structure includes upper and lower cups, and wherein said document support attachment structure comprises opposing integral upper and lower fingers having ball ends for snapping into said upper and lower cups of said outboard attachment structure.

7. The apparatus of claim 6, wherein said support mount attachment structure and said outboard attachment structures each comprises a football-shaped partial barrel having a plurality of spaced-apart partial disks with a plurality of radially arranged detents, and wherein said inboard end of each of said swing arms includes an indexing edge for engagement with said detents.

8. The apparatus of claim 1, wherein each of said central shaft portion right and left sides each include a hollow medial portion such that when combined, said right and left sides define a interior void.

9. The apparatus of claim 8, further including a latching mechanism disposed in the interior void, said latching mechanism operatively connected to a button providing means to selectively lock or separate said right and left sides.

10. The apparatus of claim 9, wherein said latching mechanism comprises a slider having an integral button exposed through an access slot.

11. The apparatus of claim 10, wherein said left side includes longitudinal slots and wherein said slider includes posts projecting into the longitudinal slots and is thereby retained within said left side of said central shaft portion.

12. The apparatus of claim 11, further including retention posts disposed on said slider, and wherein said right side includes a male portion which slidably inserts into said left side, said male portion including slots for engagement with said retention posts.

13. The apparatus of claim 12, wherein said when said right and left sides of said central shaft portion are fully approximated, said button on said slider may be moved longitudinally upward such that said retention posts are moved into the slots in said male portion thereby placing said central shaft portion in a locked configuration, and thereafter when said button is moved longitudinally downward, said retention posts are moved out from the slots in said male portion thereby placing said central shaft portion in an unlocked configuration.

14. An apparatus for displaying documents, said apparatus comprising:

a central shaft portion having right side and a left side which can be split apart, each side having an upper end and a lower end which, when combined, form first and second ring portions for capturing documents having slots, and means for releasably coupling said right and left sides into a locked configuration;

a support mount having a support mount attachment structure, wherein said support mount attachment structure comprises upper and lower cups, a plurality of swing arms disposed between the central shaft portion and said support mount, each of said swing arm having and an outboard end with outboard attachment structure and an inboard end with inboard attachment structure for pivotal connection to either said support mount attachment structure or said outboard attachment structure of another swing arm;

wherein said outboard attachment structure comprise upper and lower cups, and wherein said inboard attachment structure comprises inwardly pointing fingers having ball ends that snap into said upper and lower cups to form a hinge.

15. The apparatus of claim 14, further including an indexing mechanism.

16. The apparatus of claim 14, further comprising an indexing mechanism having a plurality of spaced apart disks disposed between said upper and lower cups, each of said disks having a plurality of radially disposed detents, and wherein said inboard end of said swing arm includes an indexing edge that engages said detents.

17. The apparatus of claim 16, wherein said spaced-apart disks collectively form a football shaped barrel structure and said indexing edge is arcuate.

\* \* \* \* \*